United States Patent [19]
Yagasaki et al.

[11] Patent Number: 5,999,225
[45] Date of Patent: *Dec. 7, 1999

[54] CAPTION DISPLAY METHOD FOR USING DIGITAL VIDEO SYSTEM

[75] Inventors: Yoichi Yagasaki; Yasushi Fujinami, both of Kanagawa; Ryuichi Iwamura, Tokyo, all of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/683,684

[22] Filed: Aug. 1, 1996

[30] Foreign Application Priority Data

Aug. 2, 1995 [JP] Japan .................................. 7-197814
Feb. 8, 1996 [JP] Japan .................................. 8-022532

[51] Int. Cl.⁶ .................................................. H04N 5/445
[52] U.S. Cl. .......................................... 348/564; 348/468
[58] Field of Search .................................... 348/384, 390, 348/423, 461, 563–565, 467, 468, 569; 386/33, 45, 95, 111–112, 125–126; H04N 5/445

[56] References Cited

U.S. PATENT DOCUMENTS

| | | | |
|---|---|---|---|
| 4,734,793 | 3/1988 | Kaneko et al. | 386/125 |
| 4,796,099 | 1/1989 | Compton | 386/125 |
| 4,989,097 | 1/1991 | Yoshio et al. | 386/95 |
| 5,245,600 | 9/1993 | Yamauchi et al. | 386/126 |
| 5,250,747 | 10/1993 | Tsumura | 386/126 |
| 5,355,450 | 10/1994 | Garmon et al. | 348/384 |
| 5,448,371 | 9/1995 | Choi | 386/125 |
| 5,510,849 | 4/1996 | Han | 386/95 |
| 5,552,833 | 9/1996 | Henmi et al. | 386/95 |
| 5,621,429 | 4/1997 | Yamaashi et al. | 348/384 |
| 5,671,019 | 9/1997 | Isoe et al. | 348/563 |

*Primary Examiner*—Richard Lee
*Attorney, Agent, or Firm*—Frommer Lawrence & Haug, LLP.; William S. Frommer

[57] ABSTRACT

A method and apparatus for encoding signals so as to form a multiplexed signal and for decoding the same. The apparatus may include an encoding unit and a decoding unit. The encoding unit may include a device for encoding a dynamic image signal so as to form a video bit stream, a device for encoding superimposed data so as to form bit map data, a device for encoding the bit map data and coordinates of a plurality of regions so as to form a bit stream of each respective region, a device for encoding the bit stream of each of the regions and coordinates of a page layer so as to form a bit stream of a page layer. The page layer specifies information indicative of start and end positions of a plurality of regions such that each of the regions are within a display area, and a device for multiplexing the bit stream of the page layer and the video bit stream. The decoding unit may include a device for separating the multiplexed bit stream into the video bit stream and the superimposed data bit stream, a device for decoding the video bit stream so as to form the dynamic image signal, a device receiving the superimposed data bit stream for obtaining coordinates of a page layer, coordinates of a plurality of regions and bit map data therefrom and for decoding the bit map data, a device for selecting one of the decoded bit map data and the dynamic image signal, and a control device.

14 Claims, 14 Drawing Sheets

```
Image_stream(){
    do{
        page()
    } while(nextbits==page_start_code)
} page(){
    page_start_code                      16 bslbf
    page_data_length                     16 uimsbf
    reserved for copyright               7 bslbf      |
    copyright_field_flag                 1 bslbf      |
    reserved                             6 uimsbf     |
    regions_in_field                     2 uimsbf     |
    duration                             32 uimsbf
    page_coordinates()
    if(copyright_field_flag=="1"){
        copyright_flag                   1 bslbf
        reserved                         7 uimsbf
        copyright_ID                     8 uimsbf
        copyright_field                  64 uimsbf
    }
    for(field_id=0;field_id<2;field_id++){
        for(i=1;i<regions_in_field;i++){
            region_startcode             8 bslbf
            reserved                     6 bslbf
            CLUT_type                    2 bslbf
            region_data_length           16 bslbf
            region_data()
        }
    }
    ancillary_data()                                  |
} page_coordinates(){
    page_vertical_start_position         16 uimsbf
    page_vertical_end_position           16 uimsbf
    page_horizontal_start_position       16 uimsbf
    page_horizontal_end_postion          16 uimsbf
}
```

FIG.7

```
region_data(){
        blending_field()
        region_coordinates()
        CLUT_entry_data()
        subtitle_bitmap()
} blending_field(){
        mix_ratio                                   4 uimsbf
        reserved                                    12 uimsbf
} region_coordinates(){
        region_vertical_start_position              16 uimsbf
        region_vertical_end_position                16 uimsbf
        region_horizontal_start_position            16 uimsbf
        region_horizontal_end_postion               16 uimsbf
}

CLUT_entry_data(){
        if(CLUT_type=="00"){
                for(i=0;i<4;i++){
                        Y_value                     6 bslbf
                        reserved                    1 uimsbf
                        mix_flag                    1 uimsbf
                        Cr_value                    4 bslbf
                        Cb_value                    4 bslbf
                }
        }
        else if(CLUT_type=="01"){
                for(i=0;i<16;i++){
                        Y_value                     6 bslbf
                        reserved                    1 uimsbf
                        mix_flag                    1 uimsbf
                        Cr_value                    4 bslbf
                        Cb_value                    4 bslbf
                }
        }
}
```

FIG.8

```
subtitle_bitmap(){
      while(processed_length<region_word_length){
            bitmap_data                         64 uimsbf
      }
} ancillary_data(){
      ancillary_start_code                16 uimsbf        |
      ancillary_data_length               16 uimsbf        |
      while(processed_length<ancillary_data_length){
            ancillary_data                  ?? bslbf/uimsbf |
      }
}
```

FIG.9

CAPTION DISPLAY METHOD FOR USING DIGITAL VIDEO SYSTEM

BACKGROUND OF THE INVENTION

1. Field of the Invention

The present invention relates to an encoding method, an encoding apparatus, a decoding apparatus, a record medium and a transmitting method for a dynamic image signal, for transmitting a dynamic image signal together with superimposed data, such as caption data, graphic data, menu image data and the like. In particular, it is suitable for applying to a record medium, such as a video tape, a video disk or the like, on which a dynamic image signal is recorded, and an encoding method and a decoding method thereof.

2. Description of the Related Art

Conventionally, for example, a caption encoding and decoding system having configuration as shown in FIG. 1 is well known. This caption encoding and decoding system includes a caption encoder 50, a record transmitting section 60 and a caption decoder 70.

Caption information, a region coordinate of the caption information, a display time of the caption information and a duration are sent from a caption generator 45 to the caption encoder 50. Here, the region coordinate is data for indicating a display position (coordinate) of a region described later. And, the duration is data for indicating a display continuation time from the display time.

The caption information is encoded into bitmap data by a caption bitmap encoder 51. This bitmap data is data into which a caption ("ABCDEFG" in FIG. 12 and the like) is encoded by means of a bitmap. This bitmap data, the region coordinate and the duration are integrated with each other as attribute information of the caption, and encoded into a caption bit stream by a caption bit stream encoder 52. The caption bit stream and the display time of the caption are sent to a multiplexer 53.

On the other hand, a dynamic image and the display times of respective images in the dynamic image are sent from a dynamic image generator 46. The dynamic image is encoded into a video bit stream by a video encoder 54. The video bit stream and the display time of the dynamic image are sent to the multiplexer 53.

The multiplexer 53 inputs the above mentioned information, that is, the caption bit stream, the display time of the caption, the video bit stream and the display time of the dynamic image, multiplexes in a predetermined order and generates a multiplexed bit stream.

The multiplexed bit stream is modulated by a modulating circuit 47, and recorded or transmitted by the record transmitting section 60 composed of a record medium 61 and a transmitting path 62.

After that, the information taken out from the record transmitting section 60 is demodulated by a demodulating circuit 48, and the multiplexed bit stream is sent to the caption decoder 70.

The caption decoder 70 receives the multiplexed bit stream, and an inverse multiplexer 71 separates the above multiplexed bit stream into a caption bit stream and a video bit stream. The caption bit stream separated by the inverse multiplexer 71 is sent to a caption bit stream analyzer 72, and the video bit stream is sent to a video decoder 73.

When separating the multiplexed bit stream into the caption bit stream and the video bit stream, the inverse multiplexer 71 takes out the information of the display time inserted in a multiplexing layer, sends the display time of the caption to a controller 47, and sends the display time of the video to the video decoder 73.

The caption bit stream analyzer 72 analyzes a syntax of the caption bit stream, and separates the caption bit stream into the bit map data, the duration and the region coordinate. The bit map data separated by the caption bit stream analyzer 72 is sent to a caption bit map decoder 75. The duration and the region coordinate are sent to the controller 74. Here, the bit map data is decoded by the caption bit map decoder 75 to thereby become caption data.

The caption data obtained by decoding the bit map data by the caption bit map decoder 75, and the video data obtained by decoding the video bit stream by the video decoder 73 are sent to a selector 76.

The controller 74 switches the selector 76 from a video side to a caption side to thereby insert the caption into the dynamic image (video), in a time and position at which the caption is displayed, on the basis of the information of the display time of the caption data, the display continuation time (duration) and the display position (region coordinate).

The above mentioned region is a displayed rectangular area, for example, an area (Region_1) in "ABCDEF" shown in FIG. 2 or an area (Region_2) in "HIJKLMN". This display position of the region (Region coordinates) is represented by a start point (H_start) and an end point (H_end) in a horizontal direction and a start point (V_start) and an end point (V_end) in a vertical direction of each of the regions, as shown in FIG. 3.

By the way, in a case that a displayed content is long and the content is displayed in a plurality of lines, the caption is divided into a plurality of lines in many cases, in order to avoid that, for example, even interlinear and unnecessary space illustrated by an oblique line block in FIG. 4 is encoded as the bit map data. Then, each of the lines becomes one region. However, Originally it is the caption that is displayed simultaneously. Thus, it is redundant to set a display start and a finish time for every region.

It is needed to move the caption from a default position specified by the bit stream to the preferable position to users.

In order to support the above mentioned moving function for the caption, in the conventional caption decoder 71 shown in FIG. 1, the controller 74 receives an outer control signal (a movement command from the user) and adds a movement offset value to the display position (Region coordinates). Accordingly, the region is moved.

Here, a case of a realtime decode is considered, in which the bit stream is decoded and displayed immediately. In this case, when the region position information (Region coordinates) belongs to each of the regions, in a case that a plurality of regions 151 and 152 exist on a screen 150 as shown in FIG. 5, and, for example, while the region 151 is decoded, there is no information of a position which the region 152 is displayed on, in a decoder.

For this reason, in a case that the region is moved and displayed by the outer control signal, it cannot be judged whether or not a presently decoded region is the movement in a displayable range. However, it cannot be judged whether or not the movement by the movement command from the user is in the displayable range for the region that is still not decoded.

For this reason, in a case that the two regions 151 and 152 exist on the screen 150 as shown in FIG. 5, even if the movement does not exceed a displayable range indicated in a movement offset amount for the region 151, the movement may exceed the displayable range for the region 152.

In a case that only one region is present on a screen 160 at a certain time point, as shown in FIG. 6, when the user specifies that the position of the region is located at the lowest portion, if two region is present at a next time point, although an upper region 162 is displayed, a lower region 163 exceeds the displayable range. In order to avoid it, the user needs to operate the movement command while always viewing the screen. This results in a problem of poor operability.

SUMMARY OF THE INVENTION

It is therefore an object of the present invention to provide an encoding method, an encoding apparatus, a decoding apparatus, a record medium and a transmitting method for a dynamic image, which can integrally process a plurality of regions that are displayed and erased simultaneously.

Another object of the present invention is to provide an encoding method, an encoding apparatus, a decoding apparatus, a record medium and a transmitting method for a dynamic image signal, which can judge whether or not all regions are displayable movements before decoding, even in a case of a realtime decode, and can move all the regions within a displayable range while reflecting an outer control signal and provides a mode in which a user does not need to always view a screen, and has the high operability.

In the present invention, a layer having a higher order in the region (here, referred to as a page) is introduced, in order to simultaneously display different regions, at a plurality of positions. Here, the page is a group of the regions that are displayed and erased simultaneously; for example, as shown in FIG. 11, Page__1 which is a group of Region__1 and Region__2, and Page__2 which is a group of Region__1, Region__2 and Region__3. By introducing the page layer, it is possible to integrally specify a display start and a finish time for a plurality of regions.

And, in the present invention, position information of all the regions included in a page or the information relative thereto is introduced into an introduced page layer. Accordingly, even in a case of the realtime decode, simply by analyzing a syntax of the page layer before decoding each of the regions, it is possible to judge what degree of movement will enable all the regions to be displayed. On the basis of the judging function, even if an outer control signal (a movement command from a user) is specified, a mode is introduced which does not follow a movement specification exceeding the above mentioned specification, but follows the specification in a range where superimposed data can be displayed. Here, this mode is referred to as a display priority mode, and a mode according to a conventional control signal is referred to as a specification priority mode.

By introducing the display priority mode, the user can move the superimposed data up to an end of an area where the superimposed data can be displayed only by continuing to push a moving button. Further, the user does not need to adjust while viewing the display position on the screen of the superimposed data, and thereby the operability can be improved. Even if a size of the superimposed data is changed at each of time points, in conjunction to the change, the superimposed data is moved within the displayable range. As a result, the user does not need to control the display position of the superimposed data while always viewing the screen.

Further objects and advantages of the present invention will be apparent from the following description of the preferred embodiments of the invention as illustrated in the accompanying drawings.

BRIEF DESCRIPTION OF THE DRAWINGS

FIG. 7 is a first division view of a syntax for a caption bit stream in layer construction used in several embodiments of an encoding method, an encoding apparatus, a decoding apparatus, a record medium and a transmitting method for a dynamic image signal in accordance with the present invention;

FIG. 8 is a second division view of the syntax for the caption bit stream in the layer construction;

FIG. 9 is a third division view of the syntax for the caption bit stream in the layer construction;

DESCRIPTION OF THE PREFERRED EMBODIMENTS

Several embodiments of an encoding method, an encoding apparatus, a decoding apparatus, a record medium and a transmitting method for a dynamic image signal in accordance with the present invention will be explained hereinafter with reference to the drawings.

At first, a first encoding method according to a first embodiment of the present invention is explained. For example, the first encoding method introduces a page layer Page( ) into a syntax of a bit stream (Bitstream) of a cation shown in FIGS. 7 to 9.

The bit stream shown in FIGS. 7 to 9 is described, for example, in a chapter 6.2 Video bitstream syntax of an MPEG-2 video (H262, ISO/IEC 13818-2), in the similar form. This is not special to a person skilled in the art.

Figure 1:
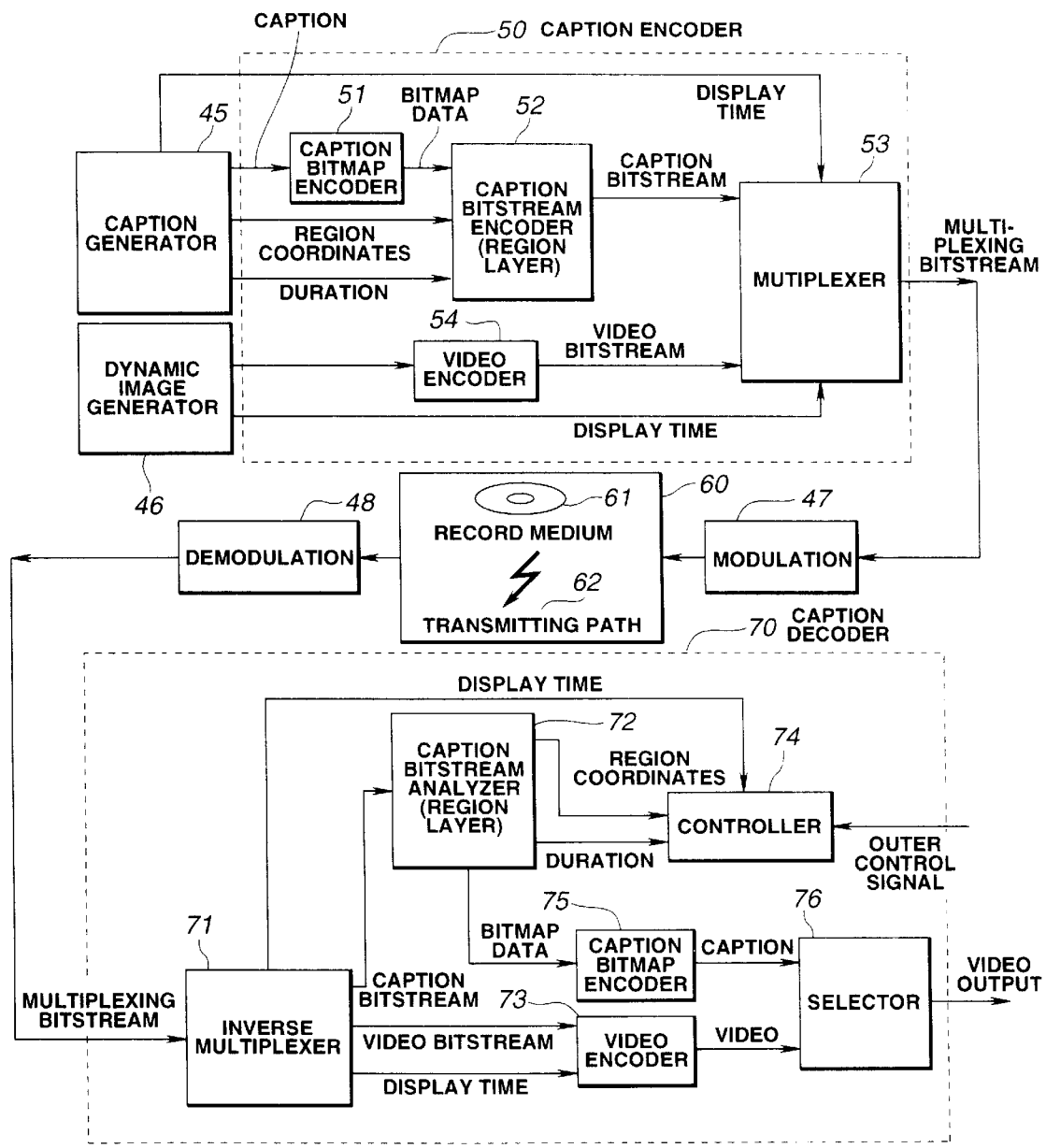
FIG. 1 is a block diagram showing configuration of a conventional caption encoding and decoding system.
Figure 2:
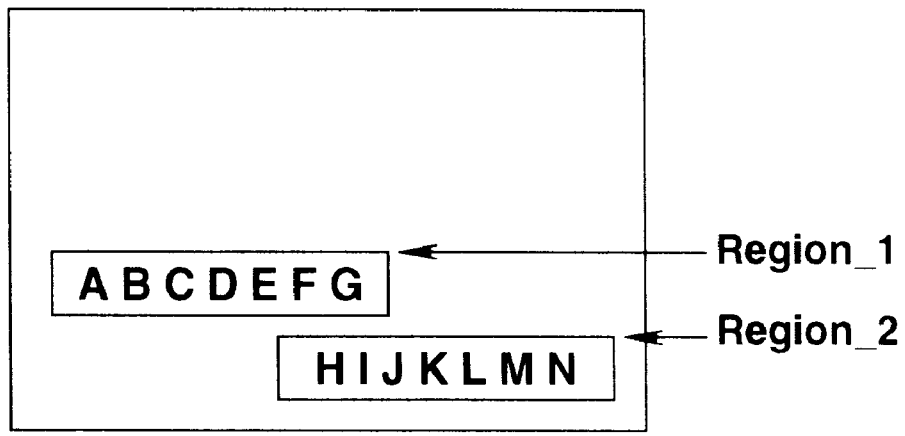
FIG. 2 is a view for explaining a region, and bitmap data outputted by a caption bitmap encoder in a caption encoder constituting the conventional caption encoding and decoding system.
Figure 3:
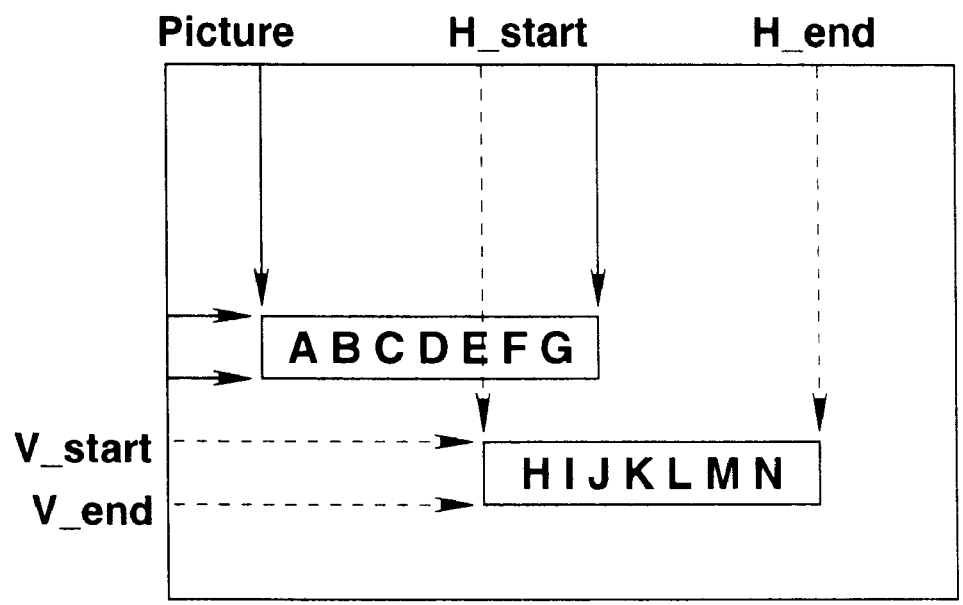
FIG. 3 is a view for explaining position information (Region coordinates) of the region.
Figure 4:
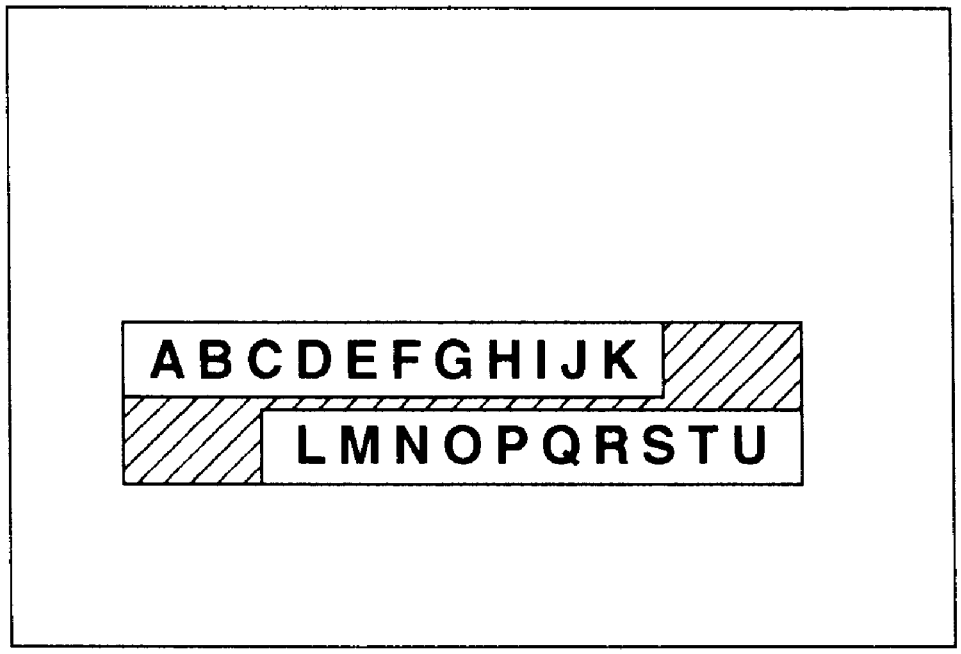
FIG. 4 is a view for explaining problems resulting from a case that a displayed content of the cation is long and displayed in a plurality of lines.
Figure 5:
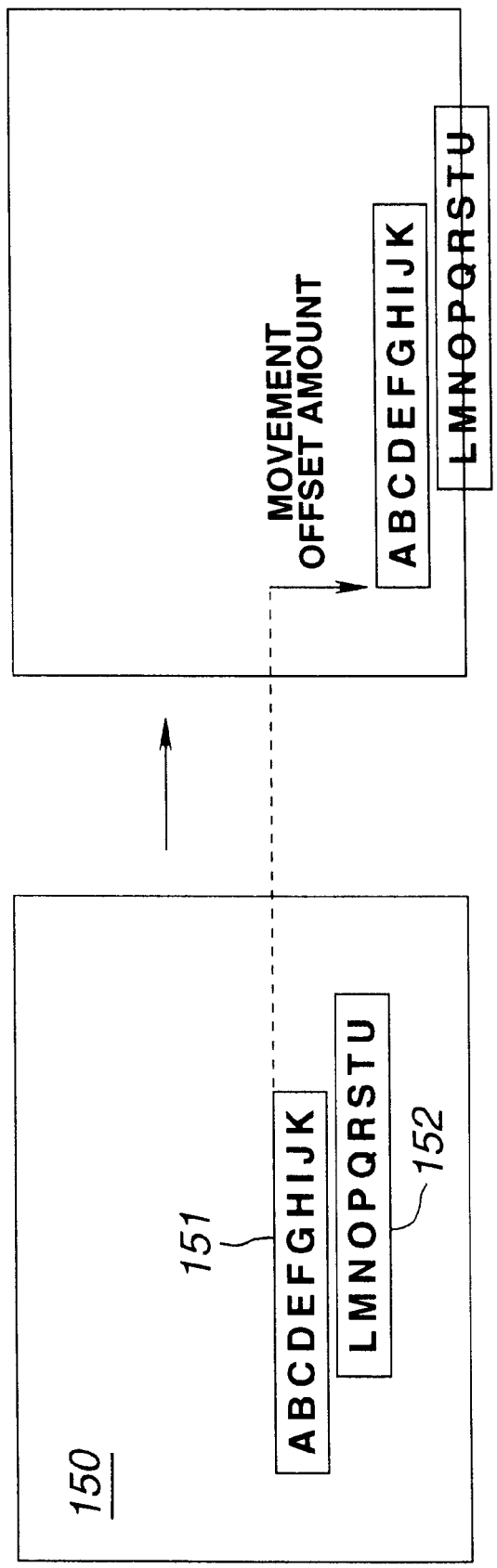
FIG. 5 is a view for explaining that even if a movement does not exceed a displayable range for a first region of the caption, there is a possibility that the movement may exceed the displayable range for a next region.
Figure 6:
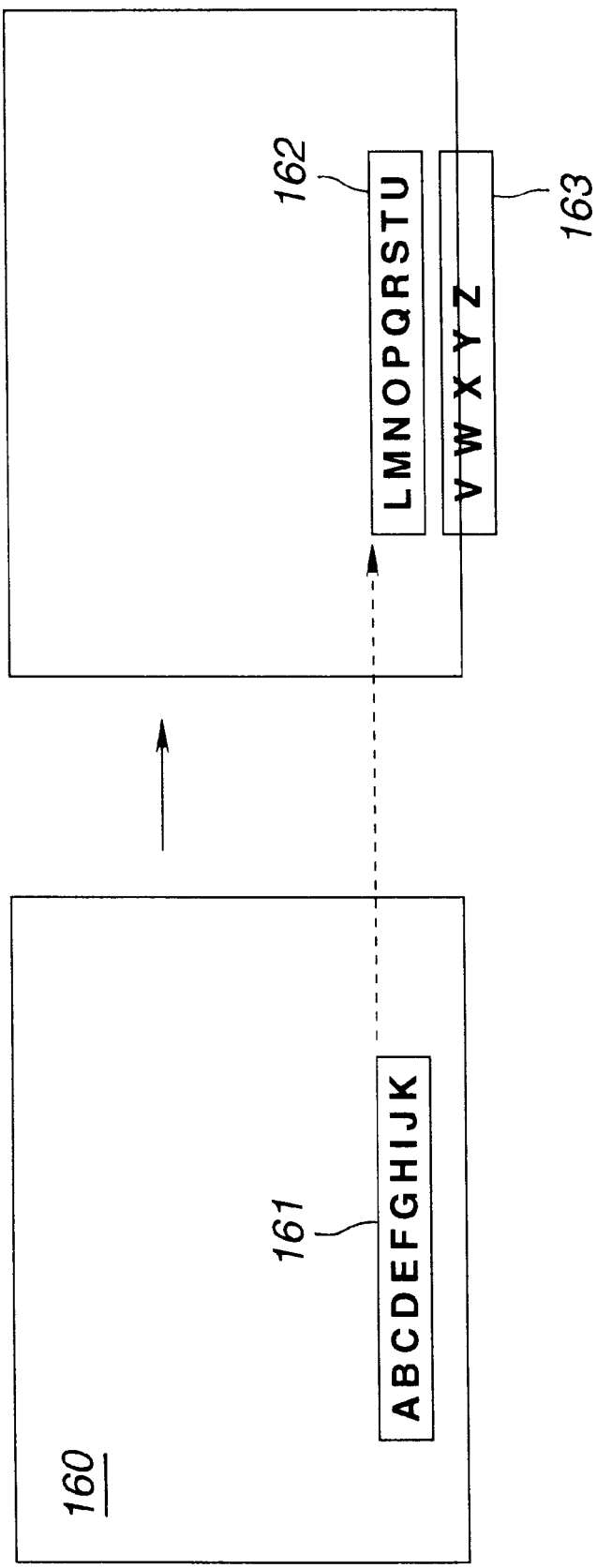
FIG. 6 is a view for explaining a fact that, in a case where the caption is constituted by one line at a certain time point, when a user specifies that a display position of the caption is located at the lowest portion, if the caption is constituted by two lines at a next time point, there is a possibility that a lower line may exceed the displayable range in the same specified position.
Figure 10:
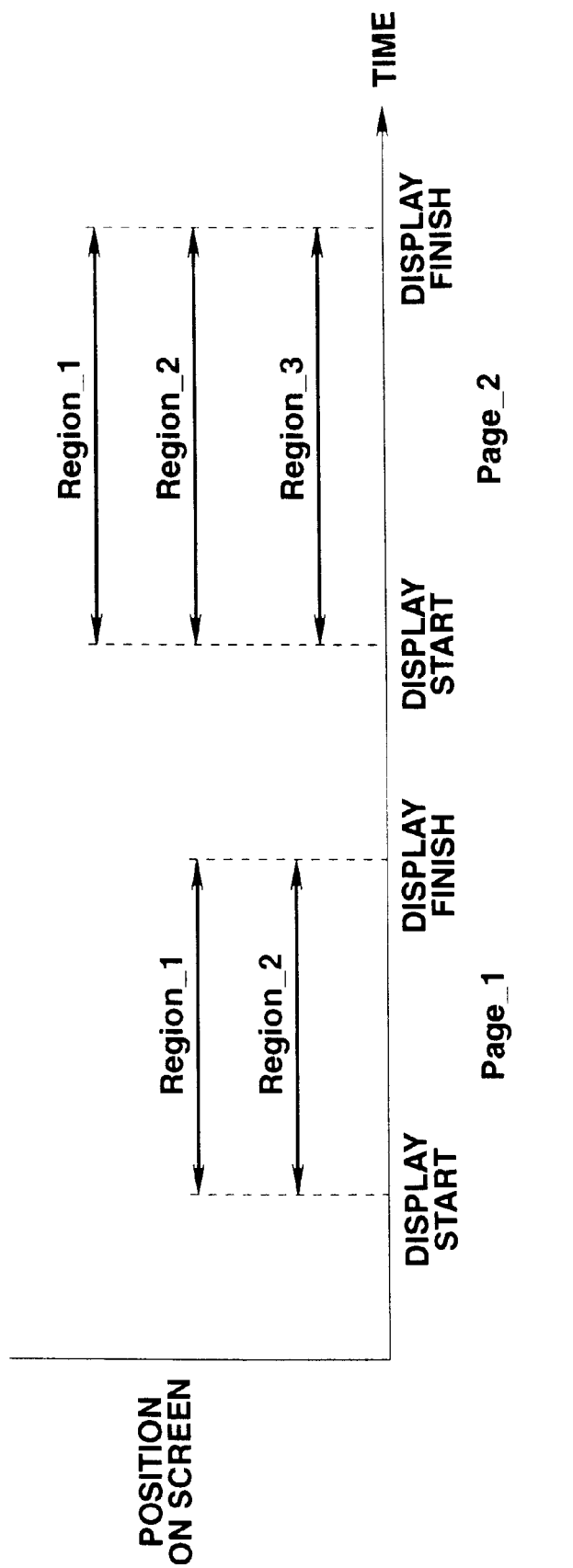
FIG. 10 is a view for explaining a conception of a page used in a first encoding method that is a first embodiment.

Here, the page (Page) means a group of the regions that are displayed and erased simultaneously. For example, it is defined that, as shown in FIG. 10, a group into which Region__1 and Region__2 are integrated is Page__1, and a group into which Region__1, Region__2 and Region__3 are integrated is Page__2. By introducing this page layer, it is possible to specify a display start and a finish time for a plurality of regions at a time, which improves an efficiency of the bit stream and makes a control of a decoder simple.

Figure 11:
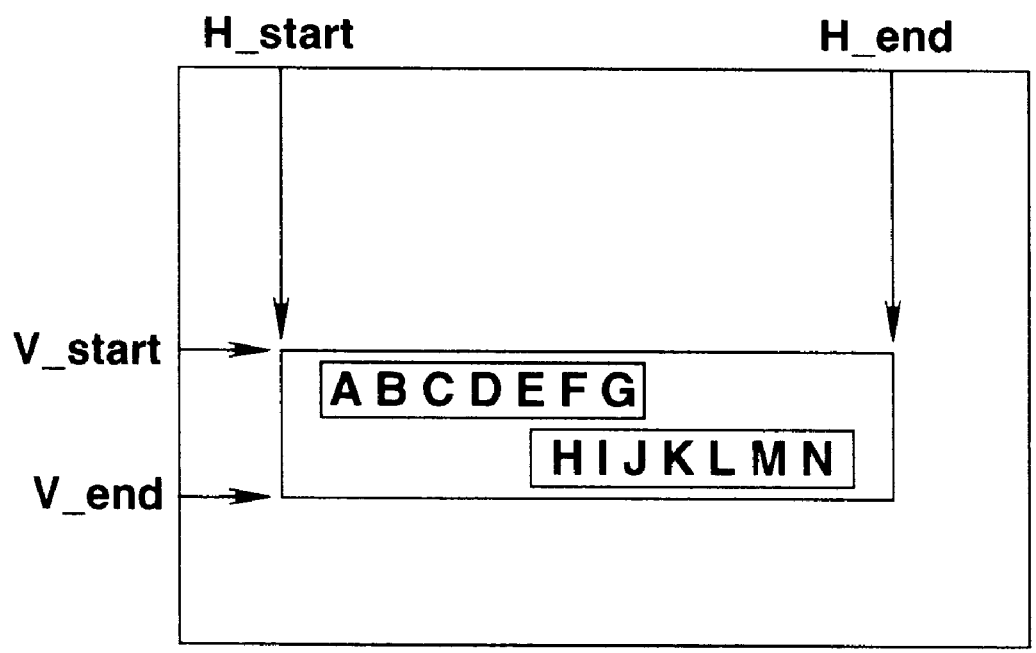
FIG. 11 is a view for explaining a conception of a page coordinate used in a second encoding method that is a second embodiment.

Next, a second encoding method according to a second embodiment of the present invention is explained. This second encoding method defines a page coordinate. That is, a rectangular area having all regions belonging to a certain page is defined as Page__coordinates( ) as shown in FIG. 11. Position information in which this rectangle can be specified is the page coordinate. For example, as shown in FIG. 11, this page coordinate provides a start point (H__start) and an end point (H__end) in a horizontal direction of the rectangle, and a start point (V__start) and an end point (V__end) in a vertical direction.

In the second encoding method, the page coordinate defined as the above Page__coordinates( ) is accommodated into a page layer page( ) in the syntax into which the first encoding method is introduced, as shown in FIGS. 7 to 9.

Next, a third encoding method according to a third embodiment of the present invention is explained. In the third encoding method, a syntax is used in which the Coordinates in all the regions included in the page are moved to the page layer.

For example, the Region coordinates( ) in the syntax as shown in FIGS. 7 to 9 is used instead of the Page coordinate( ). In this case, although the layer construction is broken, it is possible to obtain information required to judge whether or not a movement is in a displayable range.

Figure 12:
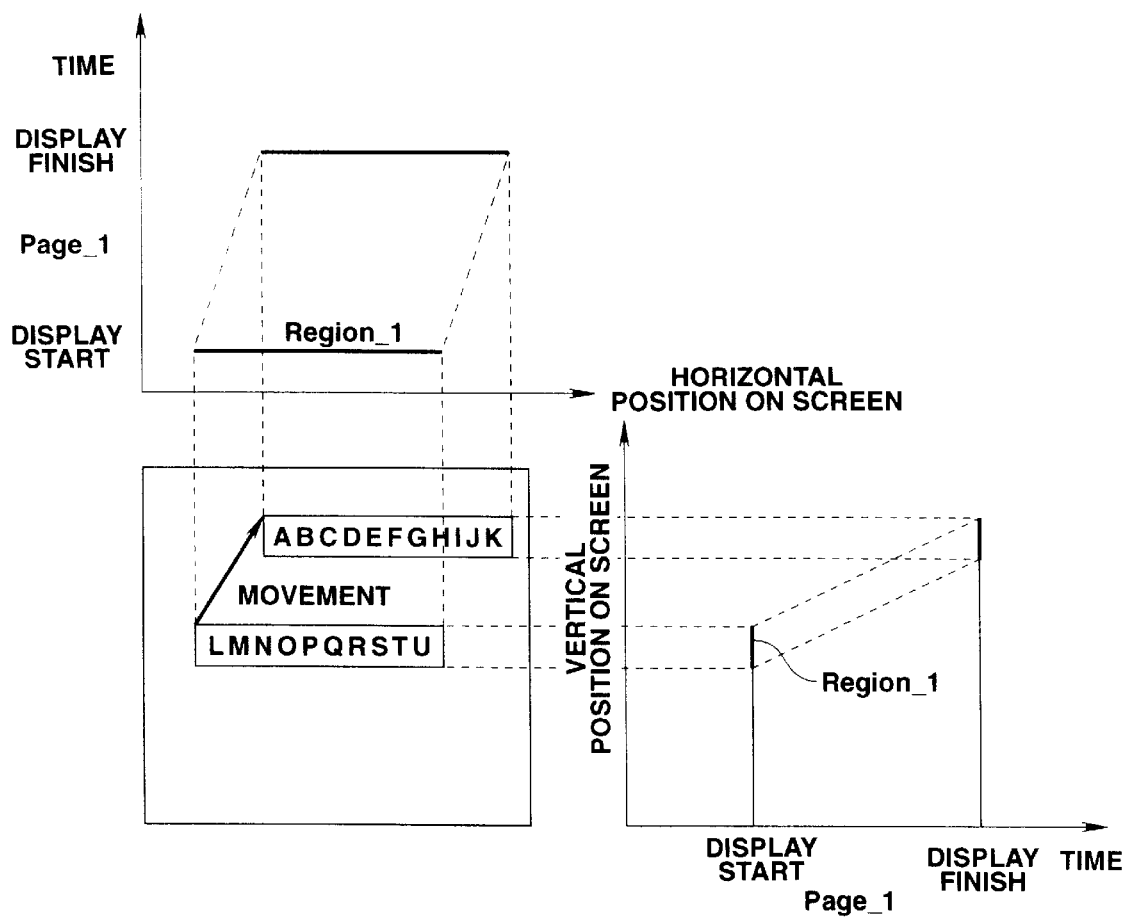
FIG. 12 is a view for explaining a conception of a movement of a page used in a fourth encoding method that is a fourth embodiment.
Figure 13:
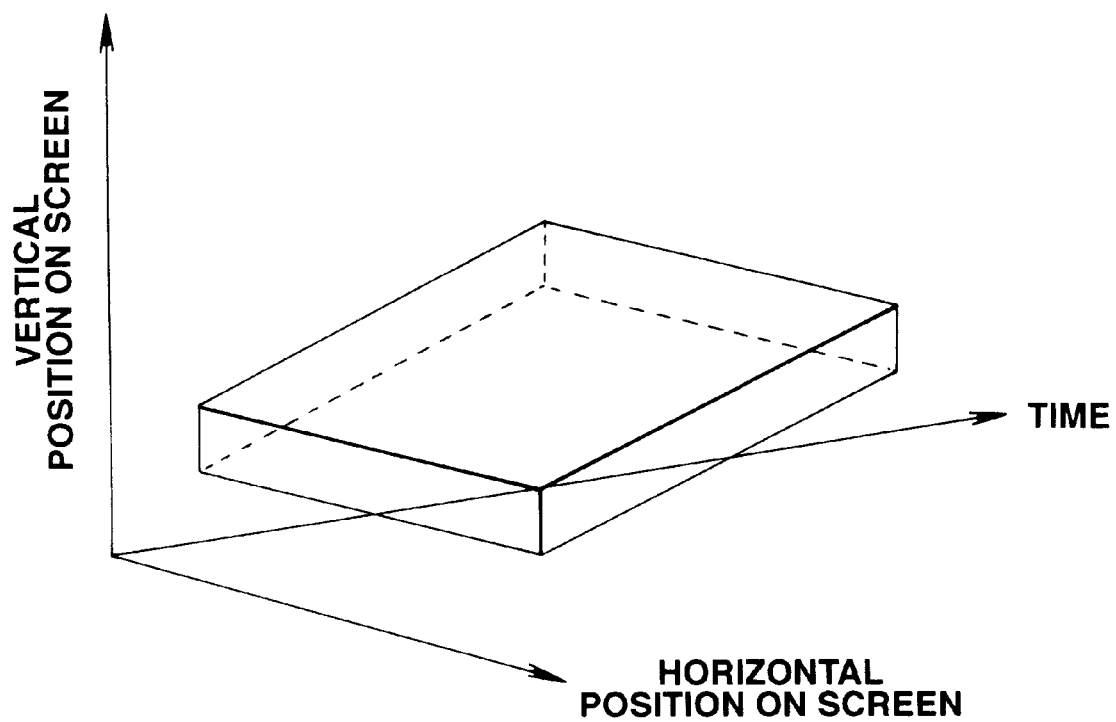
FIG. 13 is a view of showing an area occupied at a time of moving the page used in the fourth encoding method.

Next, a fourth encoding method according to a fourth embodiment of the present invention is explained. In the above second and third encoding methods, a case is dealed with in which a position of the Region is not changed during a display period, while in the fourth encoding method, a case is dealed with in which the position of the Region is moved during the display period. In the fourth encoding method, the Page coordinates is extended. For example, as shown in FIG. 12, a case is considered in which a certain Page is moved from a display start time to a display finish time. Incidentally, since only Region__1 exists within the Page, shown in FIG. 12, it may be considered that Region is Page. In a case of a movement shown in FIG. 12, an area occupied by the Page is a parallel hexahedron in a three dimensional coordinate system defined by vertical and horizontal axis on the screen and the time axis which intersect each other at right angles, as shown in FIG. 13. Coordinate information indicating an area including this parallel hexahedron is an extension of the Page coordinates in the second encoding method, as shown in FIG. 13.

Figure 14:
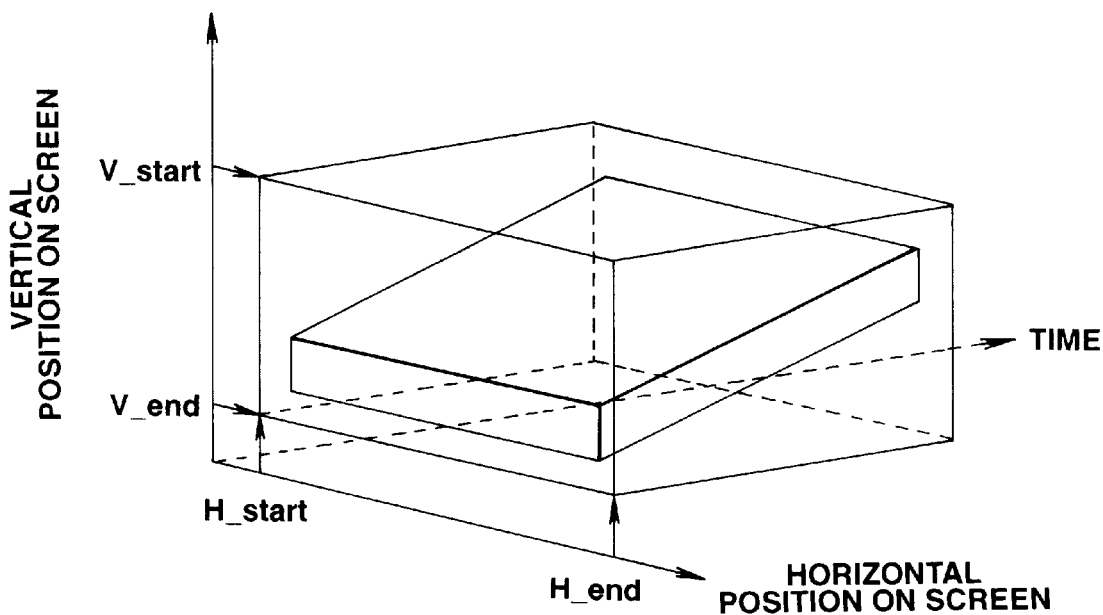
FIG. 14 is a view of showing a rectangular parallelepiped including the area occupied at a time of moving the page used in the fourth encoding method.

As a method for the extension, a rectangular parallelepiped having an area in which the Page is moved is defined, as shown in FIG. 14. Then, position information in which this rectangle can be specified is the Page coordinate, in the same method as the second.

Figure 15:
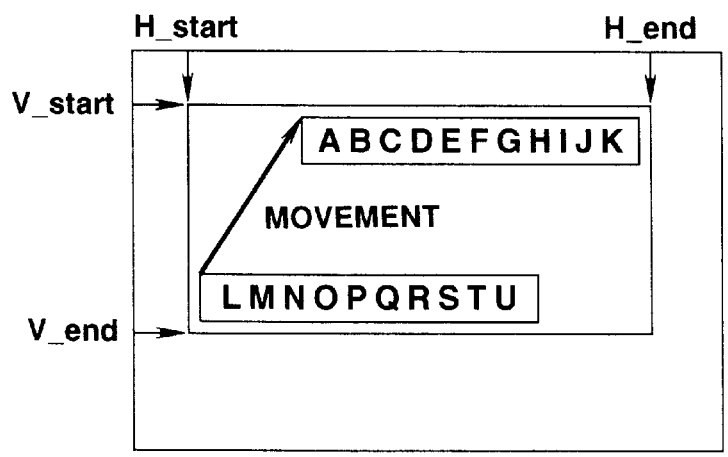
FIG. 15 is a front view of the rectangular parallelepiped including the area occupied at a time of moving the page used in the fourth encoding method.

An example according to a method for this extension is explained. For example, a start point (H__start) and an end point (H__end) in a horizontal direction, and a start point (V__start) and an end point (V__end) in a vertical direction, on a plane indicating a screen position of the rectangle are used, as shown in FIGS. 14 and 15. Then, since this Page coordinates has the same form as the Page coordinates in the second encoding method, it is accommodated into the page layer of the syntax as shown in FIGS. 7 to 9, in the same method as the second.

Figure 16:
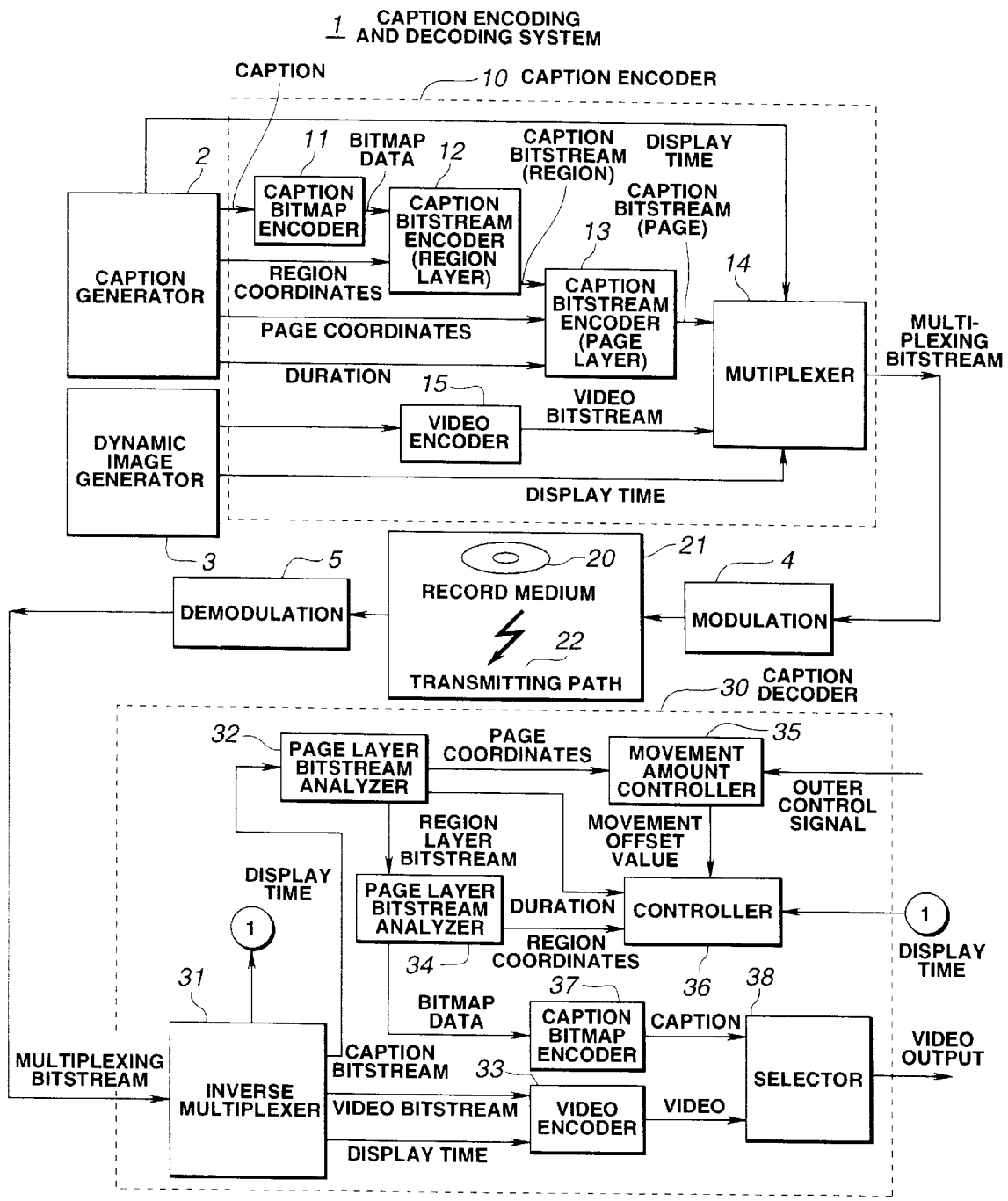
FIG. 16 is a block diagram showing a configuration of a caption encoding and decoding system that is a fifth embodiment in accordance with the present invention.

Next, a fifth embodiment according to the present invention is explained. As shown in FIG. 16, the fifth embodiment is a caption encoding and decoding system 1, which includes a caption encoder 10 for encoding caption data together with a dynamic image signal, a record transmitting section 20 for modulating the encoded data from the caption encoder 10 to thereby record or transmit, and a caption decoder 30 for decoding the demodulation encoded data which is made by decoding the modulation encoded data from the record transmitting section 20 in order to generate a dynamic image and caption data to insert the dynamic image.

Caption information, Region coordinates and Page coordinates of the caption information, a display time of the caption information and Duration are sent from a caption generator 2 to the caption encoder 10.

Here, the Region coordinates is data for indicating a display position (coordinate) of Region. The Page coordinates is data for integrally specifying a display area of a plurality of caption information. The Duration is data for indicating a display continuation time from the display time.

The caption information is encoded into bitmap data by a caption bitmap encoder 11. The bitmap data and the Region Coordinates are sent to a caption bit stream encoder 12.

The caption bit stream encoder 12 encodes the bitmap data and the Region coordinates to thereby generate a caption bit stream of a layer of the Region. The caption bit stream of the layer of this Region, the Page coordinates and the Duration are sent to a caption bit stream encoder 13.

The caption bit stream encoder 13 encodes the caption bit stream of the layer of the Region, the Page coordinates and the Duration to thereby generate the caption bit stream of the page layer.

And, the caption bit stream of the page layer and the display time of the caption are sent to a multiplexer 14.

On the other hand, the dynamic image and the display times of respective images of the dynamic image are sent from a dynamic image generator 3 to the caption encoder 10. The dynamic image is encoded into a video bit stream by a video encoder 15. The video bit stream and the display time of the dynamic image are sent to the multiplexer 14.

The multiplexer 14 inputs the above mentioned information, that is, the caption bit stream of the page layer, the display time of the caption, the video bit stream and the display time of the dynamic image, multiplexes in a predetermined order and generates a multiplexed bit stream.

The multiplexed bit stream is modulated by a modulating circuit 4, and recorded or transmitted by the record transmitting section 20 composed of a record medium 21 and a transmitting path 22.

After that, the information taken out from the record transmitting section 20 is demodulated by a demodulating circuit 5, and the multiplexed bit stream is sent to the caption decoder 30.

The caption decoder 30 receives the bit stream multiplexed by the caption encoder 10, and separates the bit stream multiplexed by an inverse multiplexer 31 into a caption bit stream and a video bit stream. The caption bit stream separated by the inverse multiplexer 31 is sent to a page layer bit stream analyzer 32, and the video bit stream is sent to a video decoder 33. The inverse multiplexer 31, when separating the multiplexed bit stream into the caption bit stream and the video bit stream, takes out the information of the display time inserted in a multiplexing layer, sends the display time of the caption bit stream to a controller 36 described later, and sends the display time of the video to the video decoder 33.

The page layer bit stream analyzer 32 analyzes the syntax of the caption bit stream, and separates the caption bit stream into a Region layer Bitstream, the Page coordinates and the Duration. The Region layer Bitstream separated by the page layer bit stream analyzer 32 is sent to a region layer bit stream analyzer 34, and the Page coordinates is sent to a moving amount controller 35, and the Duration is sent to a controller 36.

The region layer bit stream analyzer 34 analyzes the syntax of the Region layer Bitstream, and separates the Region layer Bitstream into the Region coordinates and Bitmap data. The Region coordinates separated by the region layer bit stream analyzer 34 is sent to the controller 36, and the bit map data is sent to a caption bit map decoder 37.

The video data obtained by decoding the video bit stream by the video decoder 33, and the caption data obtained by decoding the bit map data by the caption bit map decoder 37 are sent to a selector 38.

The moving amount controller 35 receives an outer control signal (a movement command from a user), determines a movement offset value on the basis of the signal, and gives to the controller 36 a clipping movement offset value so as to be within a displayable range, by adding the Page coordinates and the movement offset value. Thus, since the Page is always moved in the displayable range, the operability is improved as mentioned above.

And, the controller 36 switches the selector 38 from a video side to a caption side to thereby insert the caption into the image (video), in a time and position at which the caption is displayed, on the basis of the information of the movement offset value, the display continuation time (Duration) and the display position (Region coordinate).

In the caption decoder 30 having the above mentioned configuration, the position information of all the regions included in the page or the information relative thereto are introduced to an introduced page layer. Thus, even in a case of the realtime decode, it can be judged what degree of movement will enable all the regions to be displayed, simply by analyzing the syntax of the page layer before decoding each of the regions. On the basis of the judging function, even if the outer control signal (the movement command from the user) is specified, the specification is followed only in a range where the caption can be displayed, and a movement specification exceeding the above mentioned specification is not followed. The user can move the caption up to an end of an area where the caption can be displayed only by continuing to push a moving button, and does not need to adjust the position on the screen of the caption with viewing it on the screen. Thereby the operability can be improved. And, even if a size of the caption is changed at each of time points, according to the change, the caption is moved within the displayable range. As a result, the user does not need to control the display position while always viewing the screen.

Here, the record medium 21 in the record transmitting section 20 is a sixth embodiment of the present invention.

According to the encoding method for the dynamic image of the present invention, the dynamic image signal is recorded as the bit stream multiplexed by the video bit stream in which the dynamic image signal is encoded, and the superimposed data bit stream. The superimposed data bit stream has the layer construction having a layer for providing the superimposed data, such as caption data, graphic data, menu image data and the like, overlapped on the dynamic image by means of at least the dynamic image signal, a layer for providing a display area for the superimposed data, and above the layer for providing this display area, and a layer for integrally specifying the display area for a plurality of superimposed data.

By the way, from the viewpoint of transmitting the dynamic image signal, it can be also said that the caption encoding and decoding system 1 is a system for transmitting the dynamic image signal by means of the multiplexed bit stream, in which the video bit stream where the dynamic image signal is encoded, and the superimposed data bit stream that has the layer construction where the layer for providing the superimposed data overlapped on the dynamic image by means of at least the dynamic image signal, the layer for providing the display area for the superimposed data, and above the layer for providing this display area, the layer for integrally specifying the display area for a plurality of superimposed data are disposed, are multiplexed.

The present invention is not limited to only these embodiments. For example, the present invention can be applied to a system for displaying a logo of a broadcasting station name and a graphic, represented by a Bitmap and the like, even if it is not the cation.

According to the present invention, by introducing the page layer, it is possible to integrally specify the display start and the finish time for a plurality of regions, which improves the efficiency of the bit stream and makes the control of the decoder simpler.

And, the present invention can judge what degree of movement will enable all the regions to be displayed, simply by analyzing the syntax of the page layer, before decoding each of the regions, even in a case of the realtime decode, by introducing to the introduced page layer, the position information of all the regions included in the page or the information relative thereto.

By introducing the display priority mode, in which on the basis of the judging function, even if the outer control signal (the movement command from the user) is specified, the specification is followed only within the range where the superimposed data can be displayed, and the movement specification exceeding the above mentioned specification is not followed, the user can move the superimposed data up to the end of the area where the superimposed data can be displayed only by continuing to push the moving button.

For this reason, the user does not need to adjust while viewing the position on the screen of the superimposed data, and thereby the operability can be improved. Even if the size of the superimposed data is changed at each of the time points, in conjunction to the change, the superimposed data is moved within the displayable range. As a result, the user does not need to control the display position while always viewing the screen.

What is claimed is:

1. An encoding apparatus for generating a multiplexed bit stream, comprising:

means for encoding a dynamic image signal so as to form a video bit stream;

means for encoding superimposed data so as to form bit map data;

means for encoding said bit map data and region coordinates of a plurality of regions of a first page so as to form a bit stream of each respective region;

means for encoding the bit stream of each of said regions and page coordinates of a page layer, said page coordinates being associated with said region coordinates, so as to form a bit stream of a page layer wherein said page coordinates establish a display area where said first page is displayable to enable a decoding apparatus which is responsive to an external page movement command, to determine a superimposed data display position by determining a movement offset on the basis of the page movement command, and clipping the movement offset based on the determined movement offset and the page coordinates, such that each of said regions is always displayed on a display even if the determined movement offset is operative to move a smaller, second page to a periphery of the display, and would otherwise move a portion of the first page off the display; and multiplexing means for multiplexing the bit stream of said page layer and said video bit stream into a multiplexed bit stream.

2. An encoding apparatus according to claim 1, wherein said page layer defines a rectangular area including all said regions belonging to said page layer.

3. The encoding apparatus of claim 1 wherein said first and second pages are each captions of said dynamic image signal.

4. A decoding apparatus for decoding a multiplexed bit stream, comprising:

separating means for separating said multiplexed bit stream into a video bit stream and a superimposed data bit stream, in which said superimposed data bit stream includes information representative of a page layer which contains page coordinates associated with a first page that establish a display area where the first page is displayable, said page layer also containing region coordinates indicative of start and end positions of a plurality of regions of said first page within boundaries of said display area;

means for decoding said video bit stream so as to form a dynamic image signal;

means for receiving said superimposed data bit stream for obtaining therefrom said page coordinates, said region coordinates and bit map data and for decoding said bit map data;

means for selecting one of the decoded bit map data and the dynamic image signal; and means for determining a superimposed data display position for said first page on the basis of an externally supplied page movement command, by determining a movement offset on the basis of the page movement command, and clipping the movement offset based on the determined movement offset and at least one of the page coordinates and the region coordinates, such that each of said regions is displayed on a display even if the determined movement offset causes a smaller, second page to move to a periphery of the display, and the determined movement offset would otherwise move a portion of the first page off the display.

5. The decoding apparatus of claim 4 wherein said first and second pages are each captions of said dynamic image signal.

6. An encoding method comprising the steps of encoding a dynamic image signal so as to form a video bit stream; encoding a superimposed data bit stream so as to form bit map data, encoding said bit map data and region coordinates of a plurality of regions of a first page so as to form a bit stream of each respective region, encoding the bit stream of each of said regions and page coordinates of a page layer, said page coordinates being associated with said region coordinates, so as to form a bit stream of said page layer wherein said page coordinates establish a display area where said first page is displayable to enable a decoding apparatus which is responsive to an external page movement command, to determine a superimposed data display position by determining a movement offset on the basis of the page movement command, and clipping the movement offset based on the determined movement offset and the page coordinates, such that each of said regions is always displayed on a display even if the determined movement offset is operative to move a smaller, second page to a periphery of the display, and would otherwise move a portion of the first page off the display, and multiplexing the bit stream of said page layer and said video bit stream into a multiplexed bit stream.

7. An encoding method according to claim 6, wherein said page layer defines a rectangular area including all said regions belonging to said page layer.

8. The encoding method of claim 6 wherein said first and second pages are each captions of said dynamic image signal.

9. A record medium for recording a multiplexed bit stream formed from a video bit stream and a bit stream of a page layer, in which the video bit stream is obtained by encoding a dynamic image signal and in which the bit stream of the page layer is obtained by encoding a bit stream of each of a plurality of regions of a first page and page coordinates of the page layer, the bit stream of each respective region being obtained by encoding region coordinates of the plurality of regions and bit map data which is obtained by encoding superimposed data, said page coordinates being associated with said region coordinates, wherein said page coordinates establish a display area where said first page is displayable to enable a decoding apparatus which is responsive to an external page movement command, to determine a superimposed data display position by determining a movement offset on the basis of the page movement command, and clipping the movement offset based on the determined movement offset and the page coordinates, such that each of said regions is always displayed on a display even if the determined movement offset is operative to move a smaller, second page to a periphery of the display, and would otherwise move a portion of the first page off the display.

10. The record medium of claim 9 wherein said first and second pages are each captions of said dynamic image signal.

11. A transmitting method for transmitting a multiplexed bit stream formed from a video bit stream and a bit stream of a page layer, in which the video bit stream is obtained by encoding a dynamic image signal and in which the bit stream of the page layer is obtained by encoding a bit stream of each of a plurality of regions of a first page and page coordinates of the page layer, the bit stream of each respective region being obtained by encoding region coordinates of the plurality of regions and bit map data which is obtained by encoding superimposed data, said page coordinates being associated with said region coordinates, wherein said page coordinates establish a display area where said first page is displayable to enable a decoding apparatus which is responsive to an external page movement command, to determine a superimposed data display position by determining a movement offset on the basis of the page movement command, and clipping the movement offset based on the determined movement offset and the page coordinates, such that each of said regions is always displayed on a display even if the determined movement offset is operative to move a smaller, second page to a periphery of the display, and would otherwise move a portion of the first page off the display.

12. The transmitting method of claim 11 wherein said first and second pages are each captions of said dynamic image signal.

13. A decoding method for decoding a multiplexed bit stream, comprising:

separating said multiplexed bit stream into a video bit stream and a superimposed data bit stream, in which said superimposed data bit stream includes information representative of a page layer which contains page coordinates associated with a first page that establish a display area where the first page is displayable, said page layer also containing region coordinates indicative of start and end positions of a plurality of regions of said first page within boundaries of said display area;

decoding said video bit stream so as to form a dynamic image signal;

receiving said superimposed data bit stream to obtain therefrom said page coordinates, said region coordinates and bit map data, and decoding said bit map data;

determining a superimposed data display position for said first page on the basis of an externally supplied page movement command, by determining a movement offset on the basis of the page movement command, and clipping the movement offset based on the determined movement offset and at least one of the page coordinates and the region coordinates, such that each of said regions is displayed on a display even if the determined movement offset causes a smaller, second page to move to a periphery of the display, and the determined movement offset would otherwise move a portion of the first page off the display.

14. The method of claim 13 wherein said first and second pages are each captions of said dynamic image signal.

* * * * *